US008147879B2

(12) United States Patent
Ngadi et al.

(10) Patent No.: US 8,147,879 B2
(45) Date of Patent: Apr. 3, 2012

(54) PULSED ELECTRIC FIELD ENHANCED METHOD OF EXTRACTION

(75) Inventors: Michael Ngadi, Pierrefonds (CA); Vijaya Raghavan, Pincourt (CA); Tanya Gachovska, Lincoln, NE (US)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 461 days.

(21) Appl. No.: 12/441,658

(22) PCT Filed: Sep. 18, 2007

(86) PCT No.: PCT/CA2007/001652
§ 371 (c)(1),
(2), (4) Date: Mar. 17, 2009

(87) PCT Pub. No.: WO2008/034228
PCT Pub. Date: Mar. 27, 2008

(65) Prior Publication Data
US 2009/0314630 A1    Dec. 24, 2009

(51) Int. Cl.
*A01N 65/00* (2009.01)
*A61K 36/00* (2006.01)
(52) U.S. Cl. ........................................................ 424/725
(58) Field of Classification Search .................. 424/725
See application file for complete search history.

(56) References Cited

U.S. PATENT DOCUMENTS

| 4,297,091 A | 10/1981 | Strefling |
| 4,695,472 A | 9/1987 | Dunn et al. |
| 5,549,041 A | 8/1996 | Zhang |

OTHER PUBLICATIONS

Agarwal and Rao, 1998, Lipids, 33: 981-984.
Amiali, M. et al., 2005, Int. J. Food Eng. 1(5).
Arevalo, P. et al., 2004, Drying Technology 25(5): 1233-1246.
Barrett and Anthon, 2001, SHS Acta Horticulturae 542: VII International Symposium on the Processing Tomato, 165-173.
Baysal, T. et al., 2000, J. Agric. Food Chem. 48, 5507-5511.
Bazhal and Vorobiev, 2000, Journal of Science and Food Agriculture, 80: 1668-1674.
Bazhal et al., 2001, J. Food Eng., 50: 129-139.
Bazhal, M.I. et al., 2004, Transactions of the ASAE 47(1): 165-171.
Beerh and Siddappa, 1959, Food Tech., 13: 414-418.
Betschart, A.A. 1977, Journal of Food Science 39: 1110-1115.
Calderon-Miranda et al., 1999, Int. J Food Microbiol., 51: 19-30.
Chang, S.K.C., 1998, Protein analysis. In Food Analysis (2nd ed), ed. Nielsen S.S., 207-218, Gaithersburg, MD: Aspen Publishers Inc.
Coster, 1965, Biophys J., 5: 669-686.
Coster, H.G.L., et al., 1976, Plant Physiology 58: 636-643.
Duran, J.M. and A. Nunez-Arenas, 1988, Crop Research (Horticultural Research) 28: 111-121.
El-Belghiti, et al., 2005, J. Sci. Food Agric. 85, 213-218.
Ensminger, M.E. and C.G. Olentine (Jr.), 1978, Feeds and Nutrition—Chapter 8: pp. 245-259, Complete, 1st edition. Clovis, CA.: Ensminger Pub. Co.
Eshtiaghi and Knorr, 2002, J. Food Eng., 52: 265-272.
Fish et al., 2002, J Food Comp. Analys., 15: 309-317.
Gachovska et al., 2006. Canadian biosystems engineering, vol. 48, pp. 3.33-3.37.
Gomez, A.M. et al., 1996, Chem. Eng. J. 61, 227-231.
Heinz et al., 2001, Trends Food Sci. & Technol., 12: 103-111.
Helyes et al., 2003, ISHS Acta Horticulturae 613: VIII International Symposium on the Processing Tomato, 213-216.
Jemai and Vorobiev, 2003, J. Food Eng., 59: 405-412.
Jemai and Vorobiev, 2006, Biosys. Eng., 93: 57-68.
Knuckles, B.E. and G.O. Kohler, 1982, Journal of Agriculture Food Chemistry 30: 748-752.
Koegel, R.G. and R.G. Straub, 1996, Transactions of the ASAE 39(3): 769-774.
Lana et al., 2005, ISHS Acta Horticulturae 682: V International Postharvest Symposium, 1871-1878.
Mills, R.A., 1984, Transactions of the ASAE 1634-1637.
Nishino et al., 2005, Oncology, 69: 38-40.
Perkins-Veazie, P. et al., 2001, J. Sci. Food Agri. 8, 983-987.
Rozzi, N.L. et al., 2002, J. Agric. Food Chem. 50, 2638-2643.
Sanchez-Moreno et al., 2005, Journal of Agriculture and Food Chemistry, vol. 53, pp. 4403-4409.
Savoie et al., 1991, American Society of Agricultural Engineering, 34(4): 1604-1608.
Shi and Le Maguer, 2000, Crit. Rev. Food Sci. & Nutr. 40: 1-42.
Sinha, S. et al., 2000, Canadian Agricultural Engineering, 42(3): 153-156.
Williams and Bradley, 1967, Biophys J., 8: 145-147.
Zechmeister and Polgar 1943, J. Amer. Chem. Soc., 65: 1522-1528.

*Primary Examiner* — Karen Carlson
(74) *Attorney, Agent, or Firm* — Norton Rose Canada LLP

(57) ABSTRACT

The present invention relates to a process enhancing the extraction of phytochemicals from plant materials using pulsed electric field. The process is also used with a step of pressing, wherein the pressing and the pulse electric field treatment can be accomplished in a unique treatment chamber.

17 Claims, 9 Drawing Sheets

PULSED ELECTRIC FIELD ENHANCED METHOD OF EXTRACTION

TECHNICAL FIELD

The present invention relates to a process of isolating a pellet and extracting phytochemicals from plant materials using pulsed electric field enhanced treatment.

BACKGROUND OF THE INVENTION

One of the most challenging problems facing the biorefinery industry is the difficulty of handling and transporting bulk plant based biomass. Typically, these materials must be size reduced before they can be conveniently processed into other valuable products. Pelleting is one of the most common techniques used to convert the ground or loosed materials into more compact, higher density units that are amenable to handling. Pellets can be used as animal feed or they can be used directly in combustion for energy generation. Since the handling properties of pellets are similar to those for grains, existing, well-developed, conventional bulk handling equipment can be used to handle pelleted biomass.

Pelleting normally involves mixing the plant biomass and forcing them through a die to form pellets. More recently, most processors inject steam and binders in order to improve pellet quality and reduce spring back of the biomass as well as reduce wear on the pelleting die cavity. The binder chemical may present problems if the pellet is to be used as animal feed or as an energy source. The chemical binders must receive FDA or CFIA approval before they can be used in feeds. There is currently no effective means of achieving adequate conditioning of the biomass in order to produce high quality pellets. Pellets must be durable and able to withstand the handling operations without breaking.

One chemical component of plant biomass is phytochemicals. Phytochemicals are non-nutritive plant chemicals that have protective or disease preventive properties (Nishino et al., 2005, Oncology, 69: 38-40). There are more than one thousand known phytochemicals. It is well-known that plant produces these chemicals to protect itself but recent research demonstrated that many phytochemicals can protect humans against diseases.

Phytochemicals have been implicated in promoting the function of immune system, act directly against bacteria and viruses, reduce inflammation, and are associated with the treatment and/or prevention of cancer, cardiovascular diseases and many other diseases affecting humans.

Phytochemicals can be regrouped in various families. Terpenoids are largely constituted of carotenoid molecules, which are organic pigments that are naturally occurring in plants. There are over 600 known carotenoids which are divided in two classes: xanthophylls and carotenes. Probably the most well-known carotenoid is the one that gives this group its name, carotene, found in carrots and responsible for their bright orange color. Molecules such as alpha-carotene, beta-carotene, lycopene and astaxanthin are also examples of un-oxidized carotenoids.

Polyphenolics molecules represent an important family of phytochemicals, comprising flavonoids, phenolic acids and non-flavonoid polyphenolics. Flavonoids have been associated with anti-allergic, anti-inflammatory, anti-microbial and anti-cancer activity. Proanthocyanins and quercentin represents the most important flavonoids in terms of therapeutic interest.

Glucosinolates are a class of phytochemicals that contain sulfur, nitrogen and a group derived from glucose. They occur as secondary metabolites of many plants. A known member of the glucosinolate family is sulforaphane which represents an anticancer compound found in broccoli.

Other known phytochemicals are thiosulfonates, phytosterols, anthraquinones, capsaicin, piperine, chlorophyll, betaine, pectin and oxalic acid.

Due to their anti-allergic, anti-inflammatory, anti-microbial and anti-cancer activity and potential use in treatment and/or prevention of cardiovascular diseases, there is a great interest in increasing phytochemicals concentration in fruits or vegetables and improving extraction techniques.

It would thus be highly desirable to be provided with effective means of achieving adequate conditioning of the biomass in order to produce high quality pellets and extracting maximum amount of phytochemicals from plant materials.

SUMMARY OF THE INVENTION

One aim of the present invention is to provide a process for making pellets from a plant material comprising the steps of homogenizing the plant material; applying a pulse electric field treatment; and compacting the plant material to form pellets.

It is also provided the use of a pulse electric field treatment for making pellets from a plant material.

In a preferred embodiment, said pellets comprise phytochemicals.

Another aim is to provide a process for enhancing extraction of phytochemicals from a plant material comprising the steps of homogenizing the plant material, applying a pulse electric field treatment and collecting extracted phytochemicals.

It is also provided the use of a pulse electric field treatment for extracting phytochemicals from a plant material.

In accordance with the present invention, the plant material is selected from the group consisting of fruits, vegetables and plants.

In a preferred embodiment, said extracted phytochemicals are selected from the group consisting of terpenoids, polyphenolics molecules, glucosinolates, thiosulfonates, phytosterols, anthraquinones, capsaicin, piperine, chlorophyll, betaine, pectin and oxalic acid.

In a further embodiment, extracted terpenoids are xantrophylls or carotenoids.

In another embodiment, extracted carotenoids are selected from the group consisting of alpha-carotene, beta-carotene, lycopene and astaxanthin.

In a further embodiment, extracted polyphenolics molecules are selected from the group consisting of flavonoids, phenolic acids and non-flavonoid polyphenolic molecules.

In another embodiment, extracted glucosinolates are sulforaphanes.

A preferred embodiment is that the pulsed electric field treatment is of less than 25 kV/cm.

More specifically, the pulse electric field treatment further comprises a capacitance of discharge capacitors of less than 3 µF.

In addition, the pulse electric field treatment further comprises a number of pulses less than 200 pulses.

In accordance with the present invention, there is also provided a process for enhancing extraction of phytochemicals further comprising a step of pressing the plant material before the step of applying the pulse electric field treatment.

More specifically, the steps of pressing and applying the pulse electric field treatment are accomplished in a single treatment chamber.

In accordance with the present invention, there is also provided a process for enhancing extraction of phytochemicals further comprising a step of pressing after the step of applying the pulse electric field treatment.

In a further embodiment, the steps of pressing and applying the pulse electric field treatment are accomplished in a single treatment chamber.

In addition, the pulse electric field treatment is 6 kV/cm, with a capacitance of discharge capacitors of 1 µF and 200 pulses.

BRIEF DESCRIPTION OF THE DRAWINGS

Having thus generally described the nature of the invention, reference will now be made to the accompanying drawings, showing by way of illustration, a preferred embodiment thereof, and in which.

It will be noted that throughout the appended drawings, like features are identified by like reference numerals.

DETAILED DESCRIPTION OF THE PREFERRED EMBODIMENT

Figure 1:
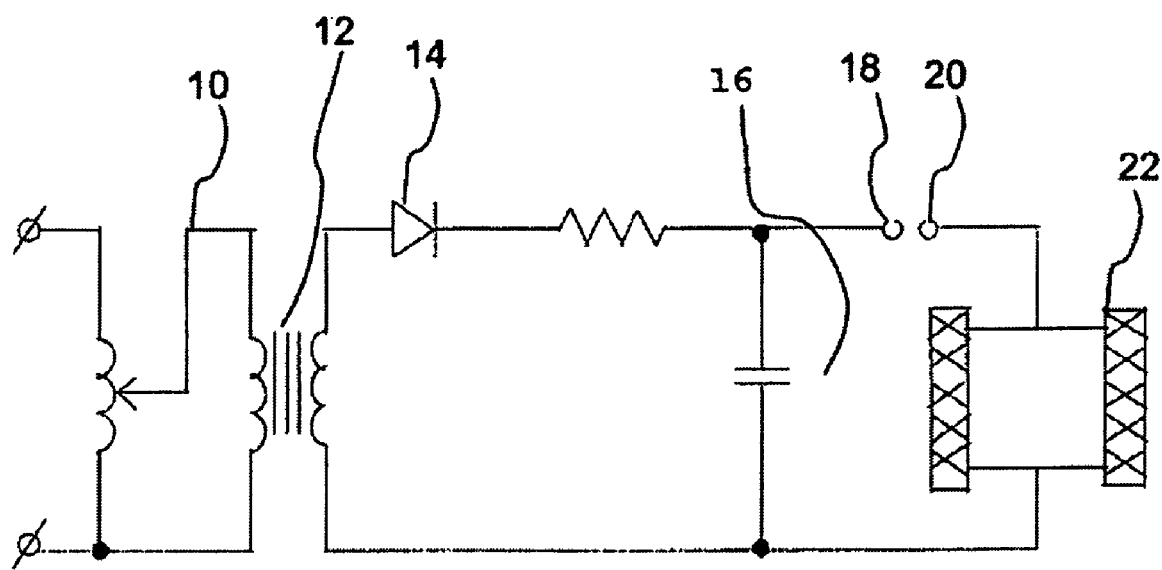
FIG. 1 illustrates an electrical circuit for a pulsed electric field system.

In accordance with the present invention, there is provided a process enhancing the extraction of phytochemicals from plant materials using pulsed electric field (PEF).

The technique discloses herein allows preparation of stable pellets without the need for chemical binders and conditioners. Such stable pellet means a densified pellet that do not easily come apart during handling or that do not "spring back" during storage. The major advantages of the new technique include ability to work at cold or reduced temperature to preserve heat sensitive ingredients in the biomass (or value if the biomass is to be used as animal feed), reduced dust and fines due to improved pellet durability, and reduced energy requirements by eliminating steam conditioning.

The possibility of using high pulsed electric field to permeabilize cell membrane of plant was discovered between the 1960's and 1970's (Coster, 1965, Biophys J., 5: 669-686; Williams and Bradley, 1967, Biophys J., 8: 145-147).

Since then it has been used in pasteurizing juice and liquid food products (Calderon-Miranda et al., 1999, Int. J Food Microbiol., 51: 19-30; Heinz et al., 2001, Trends Food Sci. & Technol., 12: 103-111; Amiali et al. 2005, *Int. J. Food Eng.*, volume 1). The technology has been found effective in enhancing juice extraction from apple (Bazhal et al., 2001, J. Food Eng., 50: 129-139), sugar beet (Jemai and Vorobiev, 2003, J. Food Eng., 59: 405-412; Jemai and Vorobiev, 2006, Biosys. Eng., 93: 57-68; El-Belghiti et al., 2005, J. Sci. Food Agric., 85: 213-218; Eshtiaghi and Knorr, 2002, J. Food Eng., 52: 265-272) and carrot (Geulen et al. 1994, Zellaufchluβ durch electrische Hochspannungsimpulse. *ZFL.*, 45: 24-27). In these studies, pulsed electric field was used as a pretreatment of the products. When a plant is treated with high pulsed electric field, the cell membranes are ruptured leading to increase in permeability of the cell walls and subsequently increase in juice yield (Eshtiaghi and Knorr 2002, supra). However, it has never been used for extracting phytochemicals. Extracting phytochemicals and extracting juice are two distinct art or process, and a method for extracting juice may not necessarily extract phytochemicals. There is no guarantee of success, as both processes are guided by distinct necessity and requirements. For example, in the juice extraction, temperature of the extraction may not be a factor. However, for extracting phytochemicals, one may be concerned depending of the phytochemicals to be extracted by the temperature or an oxidative milieu so as to prevent degradation of the phytochemicals to be extracted. Many phytochemicals are sensitive to temperature, light, oxygen (causing oxidation of the molecules rendering them less efficacious).

As used herein, the terms "plant materials" are intended to include fruits, vegetables and plants.

In one embodiment of the present invention, phytochemicals extracted by PEF are selected from the group consisting of terpenoids, polyphenolics molecules, glucosinolates, thiosulfonates, phytosterols, anthraquinones, capsaicin, piperine, chlorophyll, betaine, pectin and oxalic acid.

More specifically, the phytochemicals extracted by the present invention are terpenoids selected from xantrophylls or carotenoids.

More preferably, carotenoids extracted are selected from the group consisting of alpha-carotene, beta-carotene, lycopene and astaxanthin.

In another embodiment, polyphenolics molecules extracted by the method of the present invention are selected from the group consisting of flavonoids, phenolic acids and non-flavonoid polyphenolics.

In another embodiment, the extracted glucosinolates are sulforaphanes.

In another embodiment, samples are treated with an electric field of 4 kV/cm, preferably 8 kV/cm, 16 kV/cm, more preferably 20 kV/cm and 24 kV/cm. More preferably, samples are treated with electric field strengths of less than 25 kV/cm.

In another embodiment, the capacitance of discharge capacitors used is 0.02, preferably 0.06, 1, 2 and more preferably 3 µF.

In another embodiment, the numbers of pulses applied are 10, 20, preferably 30, 40, and more preferably 50. Further, the numbers of pulses applied are less than 100 pulses.

A combination of pressing method and pulsed electric field enhances extraction products. In a pressing processing, pulsed electric field may be applied after the first period of pressing when the press cake is compact and extraction is generally reduced. Applying pulsed electric field to a compacted cake enhances extraction of phytochemicals.

Another embodiment of the present invention is that pressing and pulsed electric field treatment steps are accomplished in the same treatment chamber.

In another embodiment, the first stage of mechanical pressing is preceded by application of PEF.

More specifically, the pressing is preceded by 200 pulses of an electric field with charged 1 µF capacitor supplying 6 kV/cm.

The present invention will be more readily understood by referring to the following examples which are given to illustrate the invention rather than to limit its scope.

EXAMPLE 1

Lycopene Extraction Using Pulsed Electric Field

Lycopene is a vibrant red carotenoid pigment principally responsible for the characteristic color of ripe tomato fruits. It is an important source of carotenoids in human diet. It has recently attracted attention of the neutraceutical industry due to its biological and physico-chemical properties including its excellent antioxidation and anticarcinogenic properties (Shi and Le Maguer, 2000, Crit. Rev. Food Sci. & Nutr., 40: 1-42). It prevents oxidation of low density lipoprotein (LDL) cholesterol and thus reduces the risk of atherosclerosis and coronary heart disease (Agarwal and Rao, 1998, Lipids, 33: 981-984). Apart from its functionality as a neutraceutical, lycopene has an important biological property of absorbing light during photosynthesis, thereby, protecting plants against photosensitization. The amount of lycopene in fresh tomato fruits depends on variety, maturity, harvest date and the environmental conditions under which the fruit matured (Barrett and Anthon, 2001, SHS Acta Horticulturae 542: VII International Symposium on the Processing Tomato, 165-174; Lana et al., 2005, ISHS Acta Horticulturae 682: V International Postharvest Symposium, 1871-1878; Helyes et al., 2003, ISHS Acta Horticulturae 613: VIII International Symposium on the Processing Tomato, 213-216).

Mature ripe red tomatoes, *Lycopersicum esculentum* (var. Savoura) were obtained from the super-market and were stored at 4° C. before using. Damaged and over-matured fruits were discarded. Before extraction, fruits were maintained to room temperature for 6-8 hours.

Fresh tomatoes were sliced and cut into small cubes of approximately 1.5 to 2.0 $cm^3$ and homogenized in a handy chopper (HC 2000-04 Type 1, Black & Decker Inc., China) for 15 s to obtain homogenous pulp. The tomato pulp was kept on ice and out of light after preparation until assayed. All analysis was done under subdued lighting at room temperature (22° C.).

Total lycopene content was measured using the low volume hexane extraction method of Fish et al. (2002, J Food Comp. Analys., 15: 309-317). The following solvents were added to a 40 ml amber screw top vial: 5.0 ml of 0.05% (w/v) BHT in acetone, 5.0 ml of 95% ethyl alcohol and 10.0 ml of hexane. In order to maintain an acceptable level of homogeneity of the sample, the pulp was stirred before 2 g (±0.001) of sample was transferred to the assay vial. Extraction was accomplished following mixing in an orbit shaker (GCA, Precision Scientific, Chicago, Ill., USA) at 180 rpm for 15 min. After shaking, 3.0 ml of deionised water was added to each vial and the samples were kept for additional 5 min on ice. The vials were then kept at room temperature for 15 min to allow for phase separation. The absorbance of the hexane (upper layer) was measured in a 1 cm path length quartz cuvette at 503 nm versus a blank hexane solvent with spectrophotometer (Ultrospec 2100 pro, Biochrom Ltd., Cambridge, England).

The lycopene content of the pulp was calculated from the absorbance value (Beerh and Siddappa, 1959, Food Tech., 13: 414-418; Perkins-Veazie et al., 2001, J. Sci. Food Agri., 8: 983-987) using the molar extinction co-efficient of $17.2 \times 10^4$/M/cm as reported by Zechmeister and Polgar (1943, J. Amer. Chem. Soc., 65: 1522-1528) for lycopene in hexane. Samples were analyzed in triplicates.

The electrical treatment of tomato pulp was applied using a high pulsed electric field generator. The electrical circuit of the generator is shown in FIG. 1. The generator produced exponential decay pulses. A variable autotransformer [10] (Powerstat® 116, The Superior electric Co., Bristol, Conn., USA) was used to supply power to the circuit. A high voltage transformer [12] (Model 62159A, Apotex Imaging Inc., Weston, ON) was used to step up the low voltage from the autotransformer. The high voltage from the transformer was then rectified by diode [14] and used to charge the capacitor [16]. Voltage of the capacitor (which corresponded to the initial treatment voltage across the treatment chamber) depended on the distance between two 15 mm stainless steel discharger spheres [18] and [20]. The break voltage for the diameter of spheres was calculated using the equation of Armyanov et al. (2001, Scientists Conference. Technology, Security and Ecology, Bulgaria, Veliko Tarnovo):

$$V_0 = 4.85 l_{sph}^{0.75},$$

where $V_0$ is break voltage (kV); and $l_{sph}$ is the distance between the spheres (mm).

To treat samples, tomato pulp was placed in a treatment chamber [22] specially designed to hold approximately 5 g of sample. The well of the chamber was made with stainless steel electrodes while the walls were made of electrical insulation material. The distance between two electrodes (gap) was 0.5 cm and it was filled with the sample.

The samples were treated at the electric field strengths of 4, 8, 16, 20 and 24 kV/cm. The capacitance of discharge capacitors used were 0.02, 0.06, 1, 2 and 3 µF. Numbers of pulses were 10, 20, 30, 40, and 50. These were applied to the samples at all the voltage and capacitance levels. The power supplied by the generator was constant and it was chosen by the autotransformer [10] to obtain pulse frequency of 1 Hz. Statistical analysis was performed using statistical software (SAS version 8.2, SAS Institute Inc., Cary, N.C., USA).

Figure 2:
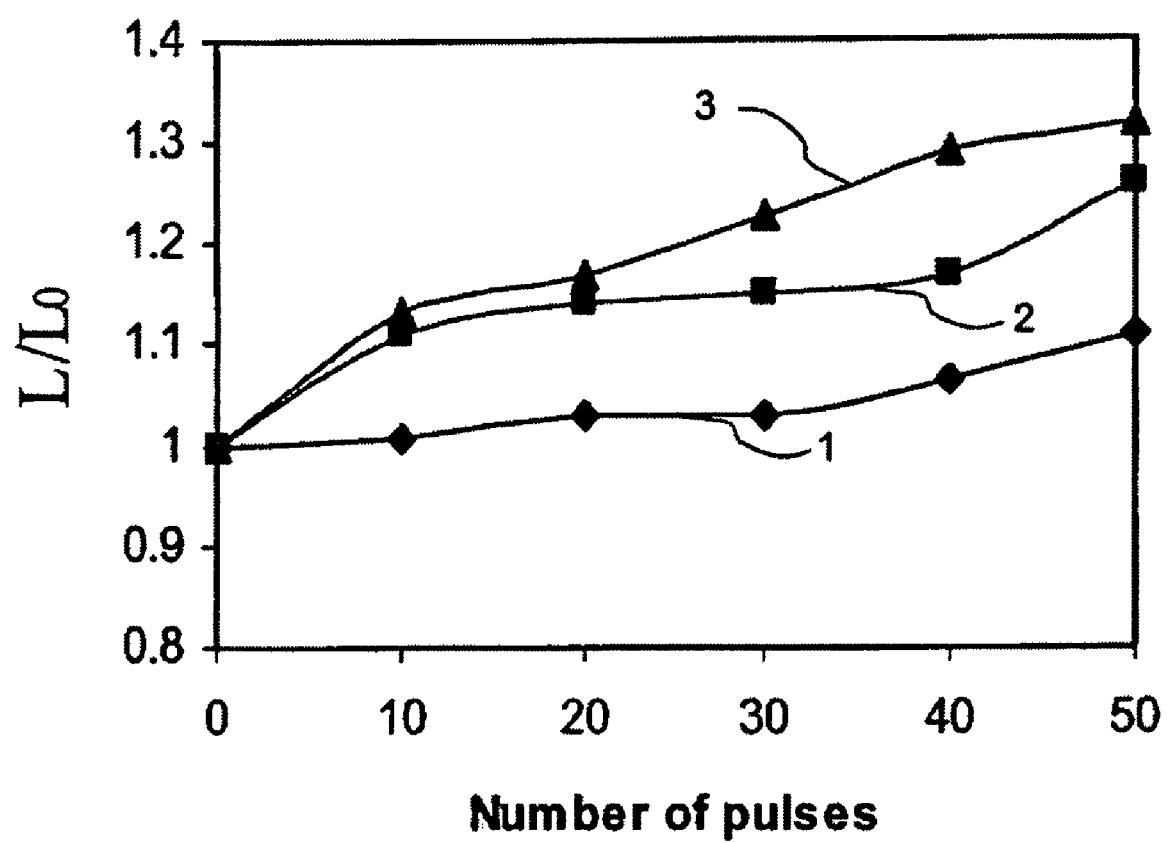
FIG. 2 illustrates relative concentration of lycopene extracted from treated tomato pulp with pulsed electric field treatment condition of 4 kV/cm, capacitance of 1 (1), 2 (2) and 3 µF (3) and number of pulses of 0, 10, 20, 40 and 50.

Statistical analysis of data revealed that the three treatment parameters namely electrical field, capacitance and number of pulses had significant effect ($p<0.05$) on the amount of lycopene extracted from tomato pulp. FIG. 2 shows relative lycopene extracted from tomato pulp using the electric field of 4 kV/cm. Increasing the capacitance and number of pulses consistently increased the amount of lycopene extracted. The percentage increase in lycopene content was maximum at 3 µF. Treatment energy increased with increasing capacitance and the number of pulses. A maximum increase of 31.9% was obtained using the capacitance of 3 µF and 50 pulses. Therefore, the result indicates that lycopene extraction was increased when higher amount of energy was delivered to the system.

Figure 3:
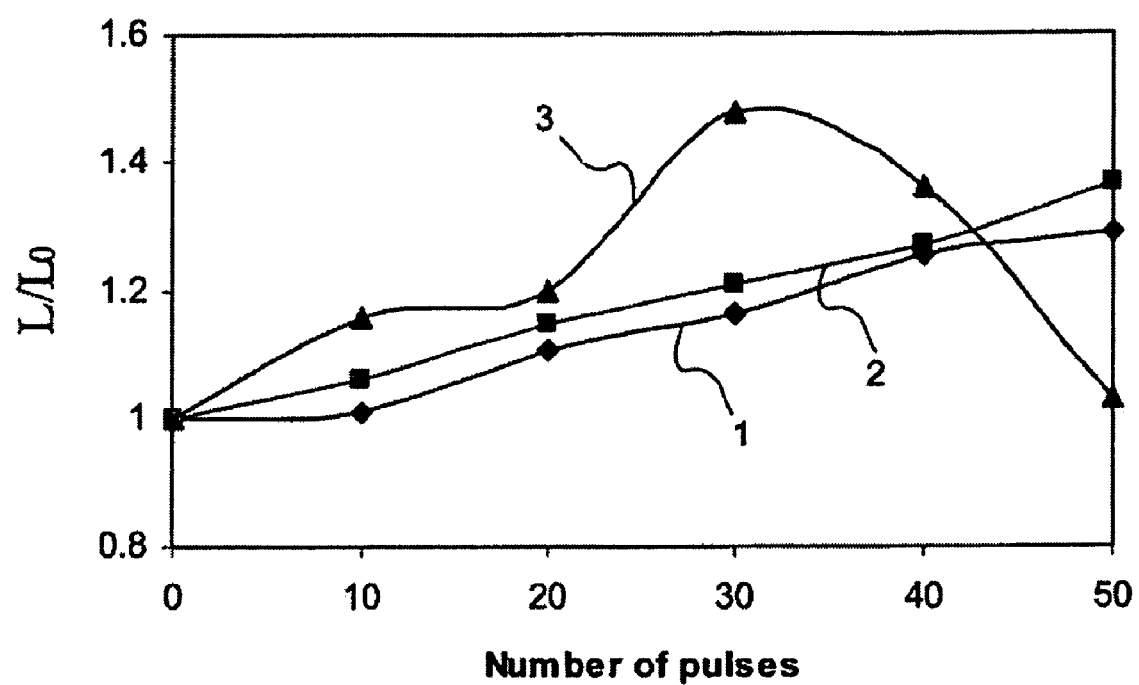
FIG. 3 illustrates relative concentration of lycopene extracted from treated tomato pulp with pulsed electric field treatment condition of 8 kV/cm, capacitance of 1 (1), 2 (2) and 3 µF (3) and number of pulses of 0, 10, 20, 40 and 50.

Extraction profile when samples were treated with a higher electric field of 8 kV/cm electric field is shown in FIG. 3. Treating tomato pulp with 1 and 2 μF capacitance resulted in a steady increase in lycopene extraction for all pulse numbers up to 50 pulses. However, when 3 μF capacitance was used, lycopene extraction reached a maximum at 30 pulses after which there was a decrease in lycopene extraction. The maximum percentage increase in lycopene content was 48.0% using the treatment parameters of 8 kV/cm, 3 μF and 30 pulses.

Figure 4:
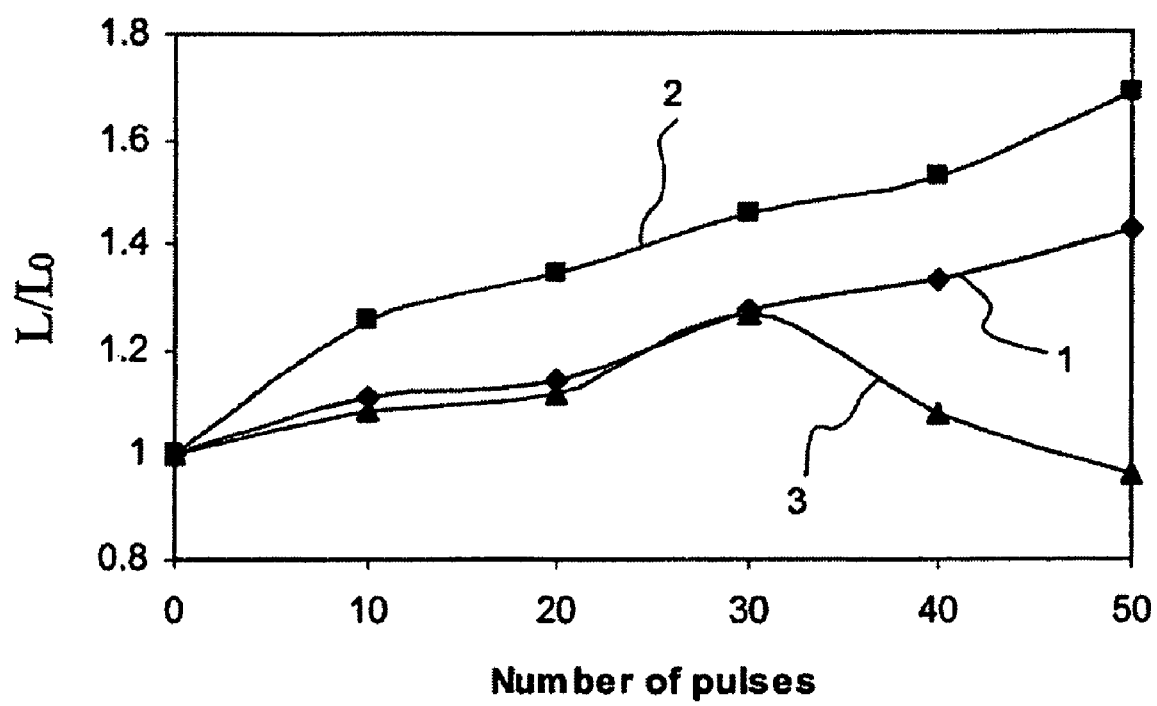
FIG. 4 illustrates relative concentration of lycopene extracted from treated tomato pulp with pulsed electric field treatment condition of 16 kV/cm, capacitance of 1 (1), 2 (2) and 3 µF (3) and number of pulses of 0, 10, 20, 40 and 50.

Larger amount of lycopene was extracted using the electric field strength of 16 kV/cm at the capacitances of 1 and 2 μF (FIG. 4). However, again when energy input was increased by increasing the capacitance to 3 μF, the amount of lycopene extracted considerably reduced. The maximum amount of lycopene was obtained at 16 kV/cm and capacitance of 2 μF and 50 pulses. The relative lycopene extraction yield in comparison with untreated samples was calculated as 68.8%.

Figure 5:
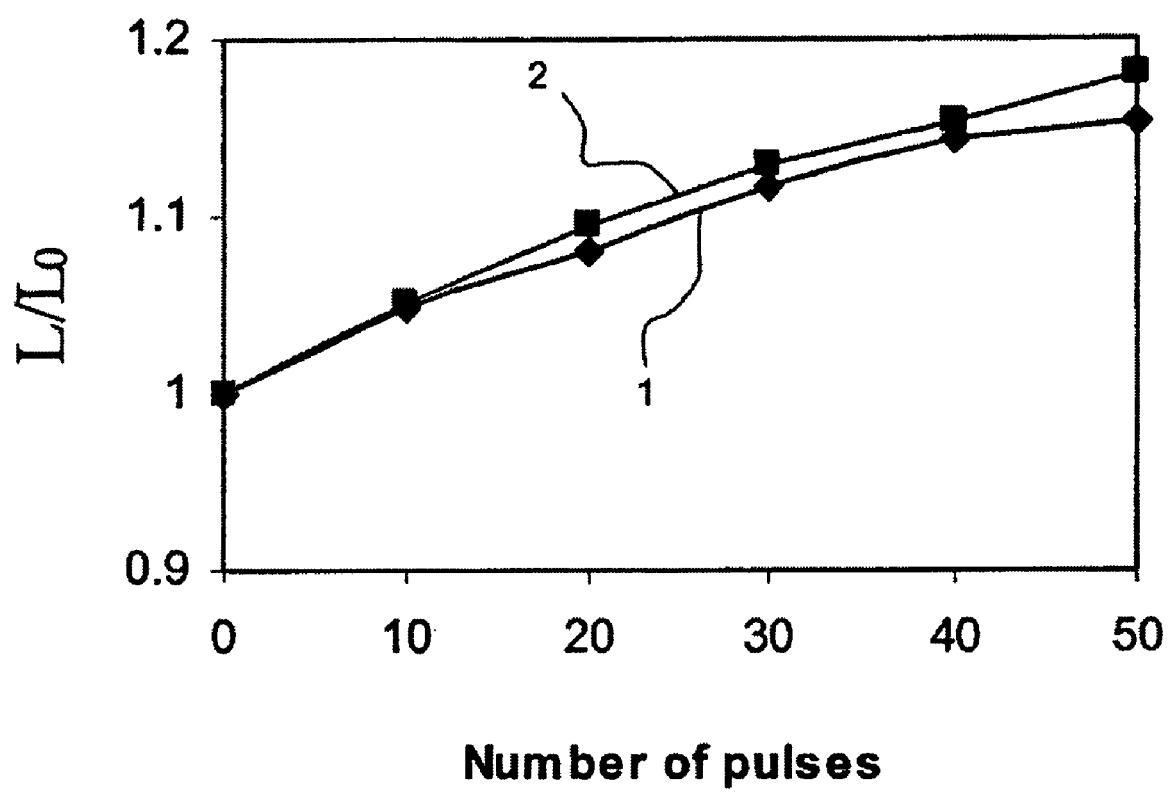
FIG. 5 illustrates relative concentration of lycopene extracted from treated tomato pulp with pulsed electric field treatment condition of 20 kV/cm, capacitance of 0.02 (1) and 0.06 µF (2) and number of pulses of 0, 10, 20, 40 and 50.
Figure 6:
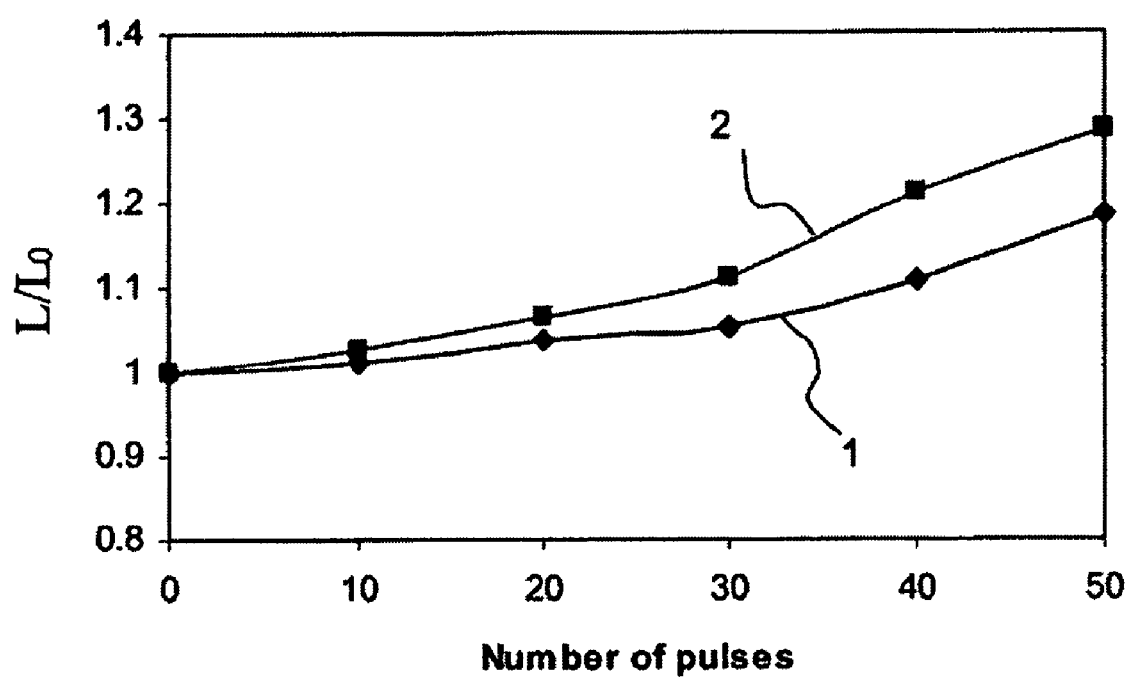
FIG. 6 illustrates relative concentration of lycopene extracted from treated tomato pulp with pulsed electric field treatment condition of 24 kV/cm, capacitance of 0.02 (1) and 0.06 µF (2) and number of pulses, 0, 10, 20, 40 and 50.

Pulsed electric field treatment is also proposed herein as a pre-treatment to pressing for enhancing lycopene extraction. Both 20 and 24 kV/cm resulted in a small increase in the lycopene extraction compared to all other voltage and capacitances (FIGS. 5 and 6). The degree of extraction was 18% higher with 20 kV/cm, 0.06 μF and 50 pulses compare to no treated samples (FIG. 5); while it was 26.3% higher for 24 kV/cm, 0.06 μF and 50 pulses (FIG. 6). Such a low increase in the extraction of lycopene at 20 and 24 kV/cm compared to 16 kV/cm is due to low energy of only 3 J/pulse for 20 kV, 0.06 μF and 4.32 J/pulse for 24 kV/cm, 0.06 μF compared to 64 J/pulse for 16 kV/cm, 2 μF. The percentage of extraction using 14.8 times bigger energy was increased only with 2.63 times.

It is thus disclosed that pulsed electrical field increases lycopene extraction. A maximum percentage of 68.8% lycopene content was obtained using pulsed electrical field with parameters: 16 kV/cm, 2 μF, and 50 pulses.

EXAMPLE 2

Mechanical Pressing Combined with Pulsed Electric Field in Extraction of Plant Materials The objective was to compare extraction efficacy of alfalfa products using 2 methods namely: mechanical pressing and combination of high pulsed electric field pre-treatment and mechanical pressing.

Whole leaf protein concentrate from alfalfa has been shown to cure symptoms of Kwashiorkor, the protein deficiency disease (Savoie et al., 1991, American Society of Agricultural Engineering, 34 (4): 1604-1608). This places alfalfa products in the category of foods that can be referred to as nutraceuticals or functional foods.

Approximately 20 cm long fresh alfalfa stems with leaves were obtained at pre-blossoming stage from Macdonald Campus, McGill University (Canada) in the fall of 2004. They were sorted, cleaned and comminuted with a domestic food processor (Sunbeam® Products Inc., China) for 5 min to obtain a homogenous mash. The mash was kept in a closed two liters vessel to prevent evaporation prior to use. The mash was properly mixed before every experiment to obtain a homogenous mix. The mash had initial moisture content of 68% g/g wet basis.

Figure 7:
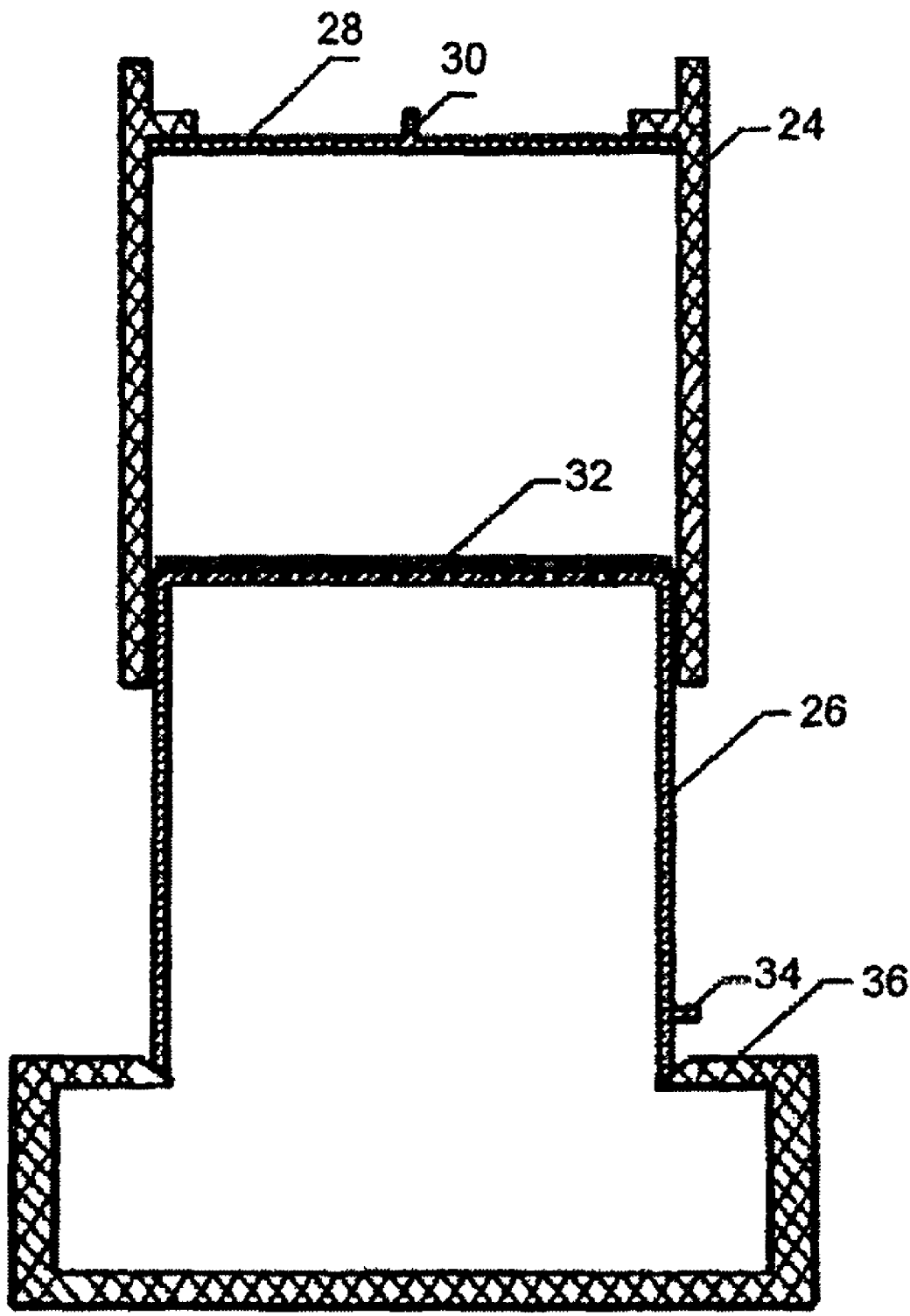
FIG. 7 illustrates a vertical cross-sectional view of a pulsed electric field and pressing treatment chamber for improved extraction of phytochemicals, in accordance with the present invention.

For pressing, approximately 40 g of the alfalfa mash was introduced into a cylindrical treatment chamber which was used for both high voltage treatment and extraction. FIG. 7 illustrates a schematic diagram of the chamber. The treatment chamber consisted of an insulated short cylinder [24] made of plastic (Polyoxymethylene, Derlin), a cylindrical perforated plunger [26] (lower electrode) and a disc base [28] (upper electrode) that formed the electrodes during PEF treatment. The perforated cylindrical plunger [26] and the base [28] are made of stainless steel. The chamber also comprises an electrical connection outlet [30] on the disc base [28] (electrode), a stainless steel sieve [32], an electrical connection outlet [34] on the cylindrical plunger [26] (lower electrode) and a plastic container for collection of extracted material [36]. During pressing, the plunger [26] sits on top of the juice container [36]. The plastic cylinder [24] containing sample is pushed through the plunger [26] to extract the material.

Pressure was applied in two stages using the Instron® Universal Testing Machine (Model 4502, Instron®, Norwood, Mass.) with the Series IX™ software. In the first stage of pressing, the filled treatment chamber was pressed until the pressure of 2 MPa was recorded. It was then held at this pressure for 5 min. In the subsequent second stage, the pressure was increased to 4 MPa and held for 5 min (Bazhal and Vorobiev, 2000, Journal of Science and Food Agriculture, 80: 1668-1674).

Figure 8:
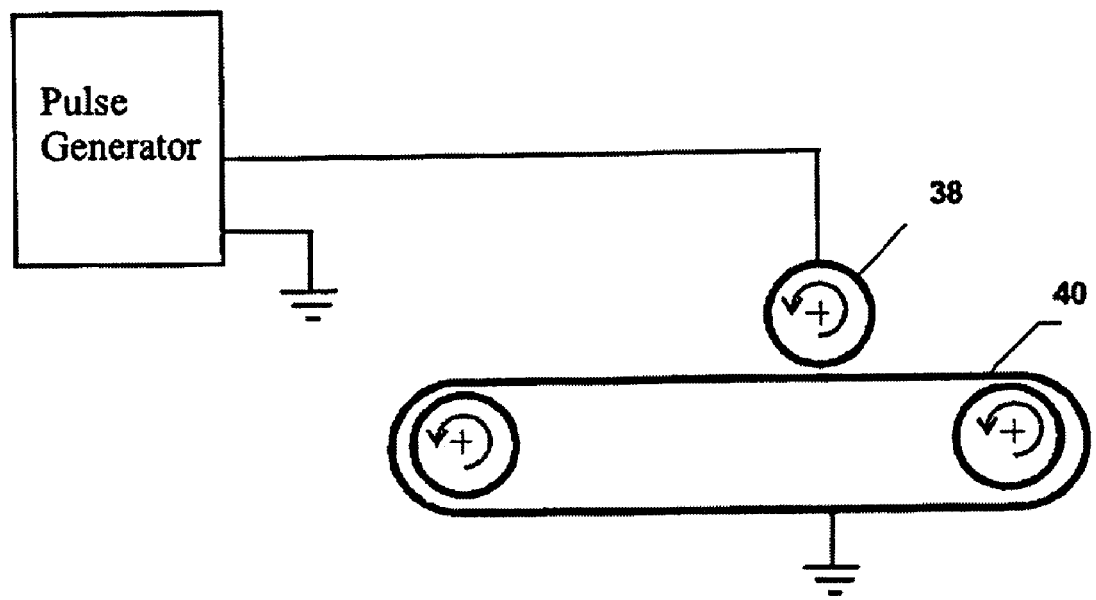
FIG. 8 illustrates system for continuous treatment of materials. Two metal electrodes [38] and [40] rotating in opposite directions draw the material as it is treated.
Figure 9:
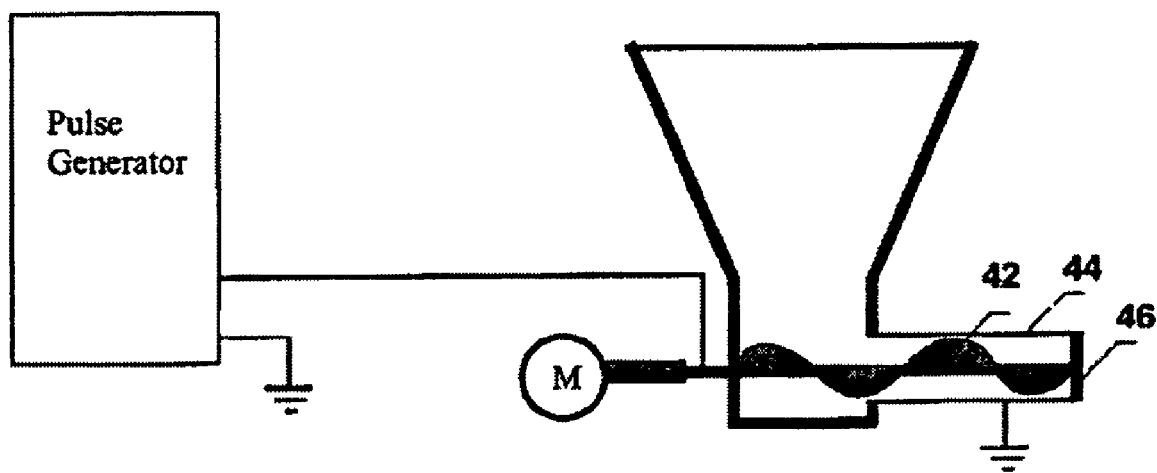
FIG. 9 illustrates systems for treatment and pressing of ground materials, wherein the schematic shows a moving electrode [42] that can be use for mashing and moving the material; a second electrode [44] and an insulation base [46] to support the ground electrode. An electric motor is coupled to the electrode by an isolation material.

Both pressing and pulsed electric field treatment steps were accomplished using the same treatment chamber [22]. This type of setup should be more amenable to industrial application. Pulsed electrical field treatment of the alfalfa mash was achieved by using a pulsed electric field generator. A variable autotransformer [10] was used to supply voltage to the circuit. The input voltage was regulated by the autotransformer [10] to obtain a pulse frequency of 1 Hz (Eshtiaghi and Knorr, 2002, supra). For PEF treatment, the first stage of mechanical pressing was preceded by application of 200 pulses of an electric field with a charged 1 μF capacitor [16] supplying 6 kV. The distance between the treatment electrodes was 4 cm. This gap between the electrodes was reduced to approximately 1 cm after the first pressing stage. Additional PEF treatment was applied before the second pressing stage. All treatments (pressing and PEF) were completed within 25 mins. Alternatively, FIG. 8 illustrates a system for continuous treatment of materials. Two metal electrodes [38] and [40] rotating in opposite directions draw the material as it is treated. Similarly, FIG. 9 illustrates a system for treatment and pressing of ground materials, wherein the schematic shows a moving electrode [42] that can be use for mashing and moving the material; a second electrode [44] and an insulation base [46] to support the ground electrode. An electric motor is coupled to the electrode by an isolation material Results of mean yield of pressed alfalfa mash are presented in Table 1.

TABLE 1

Average yield of pressed alfalfa mash at two pressures.
Material extraction , %, (g/g mash)

|  | 2 MPa | 4 MPa | Total |
| --- | --- | --- | --- |
| Untreated alfalfa | 18.8 | 8.5 | 27.3 |
| Treated alfalfa | 27.5 | 10.1 | 37.6 |

Statistical analysis showed that there were significant differences ($p<0.05$) between average values of extracted materials for PEF treated and non-treated alfalfa mash. The data showed that pulsed electric field treatment increased quantity of extracted alfalfa materials by 37.6% compared with untreated. After the first stage of pressing at 2 MPa, the increase was 27.5%. However, the increased material yield was reduced to 10.1% after the second pressure (4 MPa) application.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense

What is claimed is:

1. A process for extraction of phytochemicals from a plant material comprising the steps of:
    a) homogenizing the plant material; and
    b) extracting the phytochemicals from the plant material by applying a pulse electric field treatment, increasing membrane permeability of the plant material allowing extraction of the phytochemicals from said plant material.

2. The process of claim 1, further comprising the step of:
    c) collecting said extracted phytochemicals.

3. The process of claim 1, further comprising the step of:
    c) compacting the plant material obtained from step b) to form pellets.

4. The process of claim 1, wherein said plant material is selected from the group consisting of fruits and vegetables.

5. The process of claim 1, wherein said extracted phytochemicals are selected from the group consisting of terpenoids, polyphenolics molecules, glucosinolates, thiosulfonates, phytosterols, anthraquinones, capsaicin, piperine, chlorophyll, betaine, pectin and oxalic acid.

6. The process of claim 5, wherein terpenoids are xantrophylls or carotenoids.

7. The process of claim 6, wherein carotenoids are selected from the group consisting of alpha-carotene, beta-carotene, lycopene and astaxanthin.

8. The process of claim 5, wherein polyphenolics molecules are selected from the group consisting of flavonoids, phenolic acids and non-flavonoid polyphenolic molecules.

9. The process of claim 5, wherein said glucosinolates are sulforaphanes.

10. The process of claim 1, wherein the pulsed electric field treatment is of less than 25 kV/cm.

11. The process of claim 1, wherein the pulse electric field treatment further comprises a capacitance of discharge capacitors of less than 3 μF.

12. The process of claim 1, wherein the pulse electric field treatment further comprises a number of pulses less than 200 pulses.

13. The process of claim 1, further comprising a step of pressing the plant material before the step of applying the pulse electric field treatment.

14. The process of claim 13, wherein the steps of pressing and applying the pulse electric field treatment are accomplished in a single treatment chamber.

15. The process of claim 1, further comprising a step of pressing after the step of applying the pulse electric field treatment.

16. The process of claim 15, wherein the steps of pressing and applying the pulse electric field treatment are accomplished in a single treatment chamber.

17. The process of claim 15, wherein the pulse electric field treatment is 6 kV/cm, with a capacitance of discharge capacitors of 1 μF and 200 pulses.

* * * * *